United States Patent [19]
Zenobi

[11] Patent Number: 6,023,890
[45] Date of Patent: Feb. 15, 2000

[54] TEST CHAMBER FOR MOTOR VEHICLE ENGINES

[75] Inventor: Mauro Zenobi, Perugia, Italy

[73] Assignee: Angelantoni Industrie SpA, Massa Martana, Italy

[21] Appl. No.: 09/016,807

[22] Filed: Jan. 30, 1998

[30] Foreign Application Priority Data

Feb. 10, 1997 [IT] Italy ................................. UD97a0027

[51] Int. Cl.[7] ........................... E04H 5/00; G01M 15/00
[52] U.S. Cl. .................. 52/64; 52/79.1; 73/116
[58] Field of Search ................. 52/79.1, 64, 66, 52/302.1; 73/117.1, 116; 454/56, 57, 58, 61, 62

[56] References Cited

U.S. PATENT DOCUMENTS 5,473,844 12/1995 Martin ....................................... 52/79.1
5,495,754 3/1996 Starr, Jr. et al. ........................... 73/147

FOREIGN PATENT DOCUMENTS 1230193 9/1960 France .
6082341 3/1994 Japan .
8005518 1/1996 Japan .

OTHER PUBLICATIONS

"Neue BMW–Motorprufstande Zur Simulation Von Hohe Und Klima" MTZ Motortechnische Zeitschrift, vol. 50, No. 11, Nov. 1989, pp 540–547 (with brief translation).

*Primary Examiner*—Michael Safavi
*Attorney, Agent, or Firm*—Stevens, Davis, Miller & Mosher, L.L.P.

[57] ABSTRACT

Test chamber for motor vehicle engines comprising at least a thermally insulated floor (17) and an antiseismic supporting base (16, 116). The thermally insulated floor (17) cooperating with a covering system (20) which can be moved from an open position to a closed position. The covering system (20) in the closed position defining an inner working area (21), closed and at least thermally insulated to house at least a test bench for the engine (11). The engine (11) being functionally connected to a braking means (14). The covering system (20) being attached to a cantilevered lifting system (39). The cantilever lifting system (39) comprising lifting and guide means (23) anchored between at least a lifting column (37) located on the ground and arranged at the side of the thermally insulated floor (17) and a lateral extension cooperating with the upper part of the covering system (20).

18 Claims, 2 Drawing Sheets

TEST CHAMBER FOR MOTOR VEHICLE ENGINES

FIELD OF THE INVENTION

This invention concerns a test chamber for motor vehicle engines as set forth in the main claim.

To be more exact, the invention concerns a test chamber comprising a lower floor which is thermally insulated and associated with a movable covering which defines, in the closed position, an insulated environment with controlled parameters of temperature, humidity and pressure.

Inside the covering system there is at least a test bench to perform tests on the internal combustion engines of motor vehicles.

The invention can be applied both to the installation of new test chambers and also to adapt already existing testing equipment.

BACKGROUND OF THE INVENTION

In the field of motor vehicles, and particularly in the production of engines, the state of the art covers the testing of the engines in order to verify their performance under conditions which substantially reproduce actual working conditions.

The tests are performed in the appropriate rooms, at least partly insulated from the outside environment and which comprise at least a test bench.

In the state of the art, the tests are usually done in the appropriate rooms, built of brickwork, inside the production plants and used specifically for that purpose.

The equipment to support the engine which has to be tested is installed inside the test rooms, as is the relative brake and anything else necessary for the test.

The test rooms are also connected to pipes which remove the heat generated by the engine and which create an at least partial recycling of the air, with pipes to discharge the exhaust fumes and pipes for the water supply, and also the necessary cables for the electric power supply, for the acquisition of the measurement signals and everything else that is necessary to carry out the tests.

The solution known to the state of the art, with rooms built of brickwork, involves a plurality of disadvantages.

In the first place, these rooms require the substantially definitive use of an area specifically prepared for the purpose, with the consequent problems of the large space occupied, the building and maintenance costs, the need to excavate foundations and civil works and other problems.

Moreover, the presence of brick buildings creates a considerable rigidity as concerns the possibility of carrying out modifications in the lay-out of the plant, which can be made only by means of demolition and consequent reconstruction.

Furthermore, the brickwork solutions of the state of the art make it substantially impossible to verify the performance of the engine in conditions similar to real operating conditions; this is because it is impossible to recreate, inside brickwork rooms, conditions which reflect actual working conditions as regards thermodynamics, humidity, pressure, and air-flows.

All these factors, apart from causing considerable costs and operating difficulties, causes a considerable lengthening of the times required to carry out the tests, which, moreover, are not completely reliable.

A considerable part of the definitive development of the engine is, therefore, entrusted to further tests which are carried out with the engine already mounted on the bodywork, which further increases the time required to perfect the engine, and also the relative costs.

U.S. Pat. No. 5,509,301 shows a chamber for testing engines with a cover shaped like an arc of a circle which can be rotated from an open position to a closed position.

This solution requires an excavation to be made in the floor to house the cover when it is brought to the open position.

Moreover, this solution does not guarantee an efficient heat regulation of the closed environment defined by the cover and therefore does not guarantee the correct thermodynamic conditions for the tests to be carried out. Furthermore, the solution cannot be adopted to modify existing installations.

SUMMARY OF THE INVENTION

The present applicants have designed, tested and embodied this invention to overcome the shortcomings of the state of the art, and to achieve further advantages.

The purpose of the invention is to provide a test chamber for motor vehicle engines which will considerably reduce construction and equipping costs and times, substantially eliminating the need for civil works such as walls and foundations necessary for the construction thereof, and thus ensuring the maximum operational flexibility inside the plant.

A further purpose of the invention is to obtain a test chamber which will guarantee that, inside, an insulated environment can be obtained where it will be possible to reproduce controlled parameters of temperature, humidity and pressure such as to ensure operational and ambient conditions extremely close to the actual working conditions of the engine.

A further purpose of the invention is to obtain a test chamber which may be adopted also to modify existing installations and which will occupy a minimum space in the plant where it is installed.

The test chamber according to the invention does not involve any impact on the existing civil structures, it only needs an adequate floor surface and the necessary connections, such as the electric power supply, water supply, cables for the various services etc.

To be more exact, the test chamber according to the invention does not require any foundations to be excavated, or any other civil works, in order to be installed.

According to the invention, the test chamber substantially consists of a movable covering system cooperating with a thermally insulated floor associated with the floor of the building where the test chamber is installed.

The covering system can be cantilever lifted by lifting means and can have a first, closed position and at least a second raised position which allows the workers to access the inner work area of the test chamber.

According to the invention, the lifting means are anchored at their lower part to bases or lifting columns which rest on the floor of the building; the bases or columns are an integral part of the structure of the test chamber itself, and are arranged at the side of the thermally insulated floor of the chamber.

At the upper part, the lifting means are anchored to a lateral extension of the covering system, and the lateral extension is arranged substantially near the ceiling of the covering system.

According to the invention, an anti-seismic supporting base, which serves to support the test bench, is installed on the thermally insulated floor of the test chamber, inside the covering system.

According to a variant, the supporting base is associated with shock-absorber means able to reduce the vibrations which occur during tests, and thus reduce the stresses imposed on the floor of the chamber when the tests are performed.

The test bench for the engines is solidly installed on the supporting base, as are any possible braking elements associated with the engine and any other necessary equipment for the tests.

According to a variant, the braking elements are located outside the covering system.

According to the invention, the lifting means of the covering system comprise at least an actuator, advantageously a pair of actuators arranged symmetrically, cooperating with guide means; the guide means serve to ensure the parallel displacement of the covering system, preventing any possible rotation thereof, and to ensure that the surface area occupied by the test chamber remains unchanged in all its working positions.

According to the invention, the covering system is associated, at its upper part, with a channel to convey and treat air; the ventilation and conditioning systems, such as the cooling unit or exchanger and the heating unit, are arranged along this channel.

The ventilation system and the heating and cooling units together define the air-conditioning unit.

According to a variant, the lateral extension of the covering system associated with the lifting means contains the units to feed the cooling and heating units.

The feeder units may comprise, for example, the cooling unit which feeds the cooling exchanger, the unit which feeds the heated fluid to the heating exchanger, or the feeder unit which supplies electric energy to the electric heating elements.

In this way, both the air conditioning unit and the relative feeder units can be moved with the covering system and do not occupy any floor space outside the test chamber.

The channel to convey and treat air is arranged on the ceiling, above the test chamber and communicates, at its ends, with the inner work area inside the test chamber.

By means of the ventilation system, the air is taken in from inside the test chamber, delivered inside the conveying and treating channel and then, conditioned and adjusted to the appropriate temperature, re-delivered inside the test chamber.

The channel to convey and treat air includes at its end a delivery mouth cooperating with the inside of the test chamber in a position substantially close to that of the engine located on the test bench.

According to a variant, the delivery mouth is associated with deflector means able to direct the flow of thermally adjusted air in a controlled manner in the direction of the engine.

In the embodiment according to the invention, the air, since it is opportunely directed and conveyed in the direction of the engine, always circulates inside the test chamber, and affects the supporting base only minimally.

This situation ensures for the engine extremely precise and controlled heat conditions.

According to a variant, the thermally insulated floor on which the supporting base rests is concave or "bath-shaped".

This concave shape makes it possible to house the connections which go outside the test chamber, whether they be for fluids or electricity, below the supporting base; the connections can be taken outside by means of the appropriate guide channels made on the edge of the concave floor.

BRIEF DESCRIPTION OF THE DRAWINGS

The following Figures are given as a non-restrictive example, and show some preferred embodiments of the invention as follows.

DETAILED DESCRIPTION OF THE PREFERRED EMBODIMENTS

Figure 1:
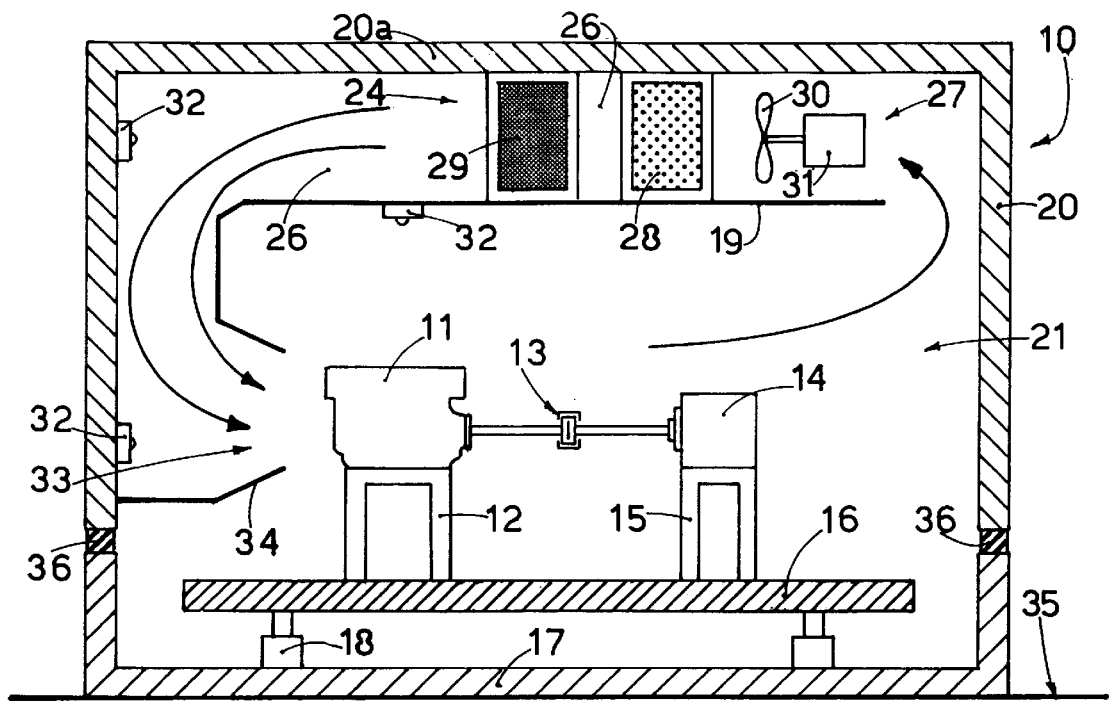
FIG. 1 shows in diagram form a cross section of the test chamber for motor vehicle engines according to the invention.

The test chamber 10 shown in FIG. 1 is used to perform tests on internal combustion engines 11 for motor vehicles.

The engine 11 is associated with support means 12 comprising, in a manner known to the state of the art, at least attachment and suspension elements, and is connected to discharge means to discharge the combustion gases, to cables connected to an outer control panel to set the working parameters and to receive the measurement signals, and also to sensors and monitoring transducers, all this not being shown in that it is covered by the state of the art.

The engine 11 is connected by means of a joint 13 to a dynomometric brake 14, in the case of FIG. 1 positioned inside the test chamber 10 itself.

The test bench 12 and the support 15 for the dynamometric brake 14 are solidly attached, by means of bolts or other similar attachment systems, to a supporting base 16, in this case of the anti-seismic type.

The supporting base 16 is located on the thermally insulated floor 17 of the test chamber 10 and is supported at the lower part, in this case, by a plurality of dampers 18 which attenuate the vibrations and stresses which are produced on the thermally insulated floor 17 and therefore on the floor of the building 35.

Figure 2:
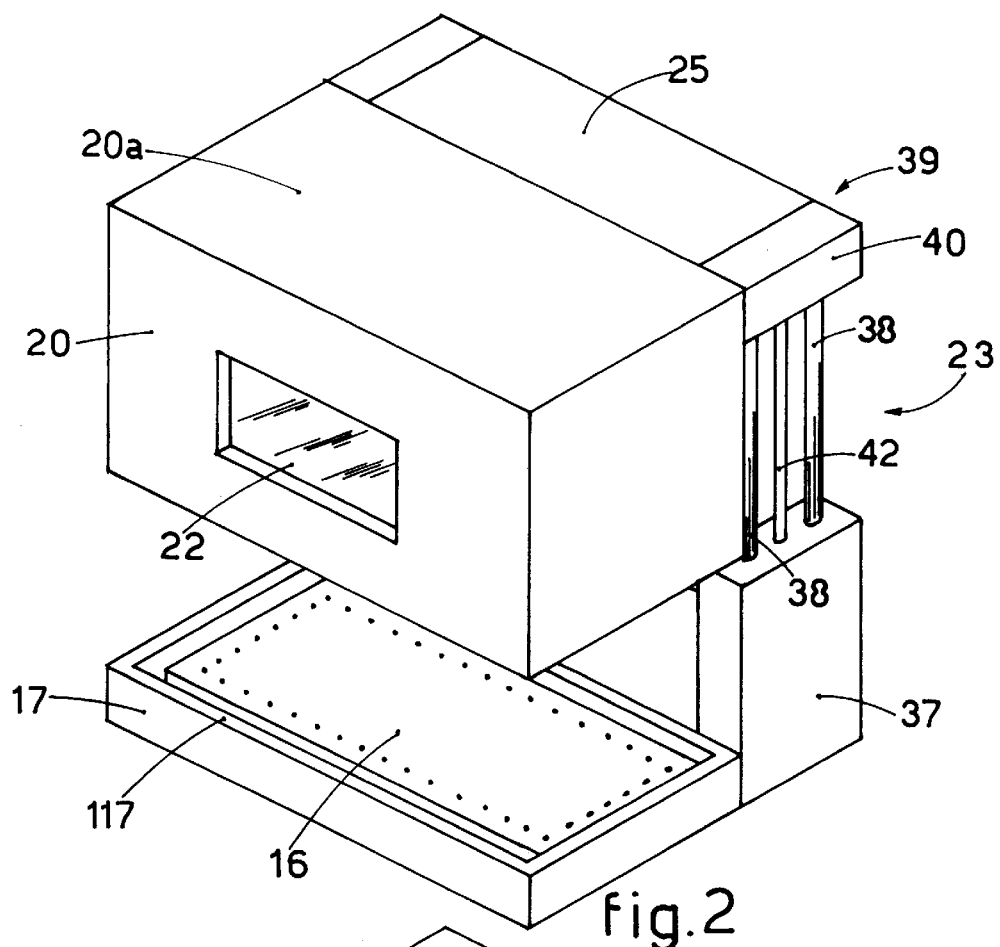
FIG. 2 shows a partial prospective view of the test chamber according to the invention.
Figure 4:
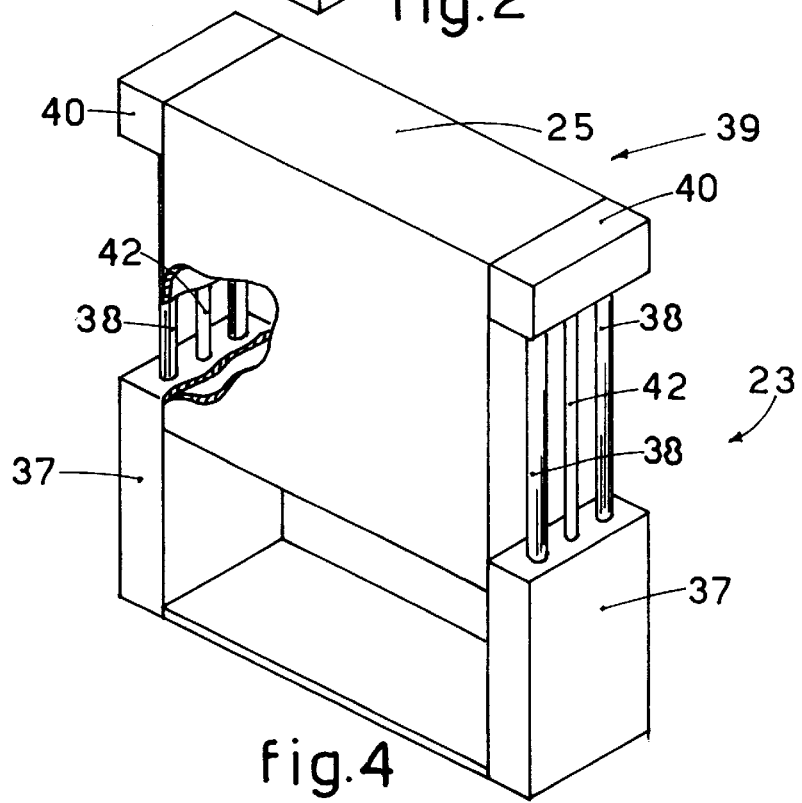
FIG. 4 shows a large scale view of the lifting system used in the test chamber according to the invention.

The test chamber 10 has a covering system 20 associated with the thermally insulated floor 17. The covering system 20 can be moved from a closed, lowered position (FIGS. 1 and 3) to a raised, open position (FIG. 2) which allows access to the inner work area 21 inside the test chamber 10.

Between the covering system 20 and the thermally insulated floor 17 there are packing strips 36; moreover, in this case, the covering system 20 includes an inspection window 22 (FIG. 2) at the side.

Near the ceiling 20a, the covering system 20 includes a wall acting as a false ceiling 19 which, together with the ceiling 20a, defines a channel 26 to convey and treat air communicating with the inner work area 21 of the test chamber 10.

The air conditioning unit 24 is present along the channel 26, and comprises, in this case, a ventilation system 27 to take in and convey the air, a heating unit 28 and a cooling unit 29.

The ventilation system 27 comprises at least a fan 30. According to a variant, the motor 31 of the fan 30 is associated to a frequency converter in order to vary, in a controlled manner, the flow of air which is made to circulate inside the inner work area 21 of the test chamber 10.

The heating unit 28, in one embodiment of the invention, consists of a plurality of electric heater elements.

According to a variant, the heating unit 28 consists of an exchanger through which thermally adjusted fluid flows; this solution ensures that the surface temperatures of the exchanger do not exceed certain limit values which could compromise its functioning and its efficiency.

The channel 26 to convey and treat air ends in a delivery mouth 33 associated, in this case, with deflector means 34 suitable to direct the flow of recircled air correctly in the direction of the engine 11.

The inclusion of the deflector means 34 ensures that the recircled air affects the engine 11 in an efficient and correct manner, so that the correct heat conditions and flow of air are maintained and so that the air does not affect the supporting base 16.

The covering system 20 includes in this case a lateral extension consisting of a box structure 25.

Inside the box structure 25 there are the supply units (not shown here) for the heating unit 28 and the cooling unit 29, for example the unit which supplies the hot fluid in the event that a heat exchanger is employed, the unit which supplies the cold exchanger, or again the unit which supplies electric power, in the event that electric heater elements are employed.

This configuration ensures that the whole air conditioning unit 24, together with its own feeder units, moves with the covering system 20 without occupying any space inside the plant.

In cooperation with the channel 26 to convey and treat air and/or the inner work area 21 of the test chamber 10 there are temperature monitors 32.

At least one temperature monitor 32 is placed near particular points of the engine 11.

The temperature monitors 32 allow the temperature of the recircled air to be constantly and continuously controlled; they also make it possible, for example, to act in feedback on the heating unit 28 and/or the cooling unit 29 in order to maintain and/or restore the desired heat conditions.

The lifting system 39 for the covering system 20, in this case, supports with cantilevers the movable part of the test chamber 10 and comprises lifting and guide means 23 consisting of a pair of oil-dynamic actuators comprising lifting rods 42.

Each of the oil-dynamic actuators cooperates with cylindrical guides 38 suitable to prevent any possible rotation of the covering system 20 during the lifting and lowering operations.

In this case, the lifting and guide means 23 are anchored at the lower part to a pair of lifting columns 37 associated with the floor and at the upper part with specific anchor zones 40 defined on the box structure 25.

The lifting columns 37 are arranged at the side of the thermally insulated floor 17 and are wholly associated with the structure of the test chamber 10; the lifting system 39 is supported by its own structure and therefore does not need foundations to anchor it to the ground.

Moreover, the lifting columns 37 give a sufficiently wide support surface which adequately supports the tensions and stresses on the floor of the building 35 even during the steps when the covering system 20 is raised.

According to a variant which is not shown here, the lifting and guide means 23 comprise a coupling system of the screw/nut type associated with an electrically driven motor.

According to another variant not shown here, the lifting and guide means 23 comprise systems of the type with lifting cables driven by an electric motor and cooperating with back-up wheels.

According to a further variant which is not shown here, the guide elements consist of "U" shaped guides associated with sliding wheels.

However, it is also possible to use other systems known to the state of the art to lift and guide the covering system 20.

Figure 3:
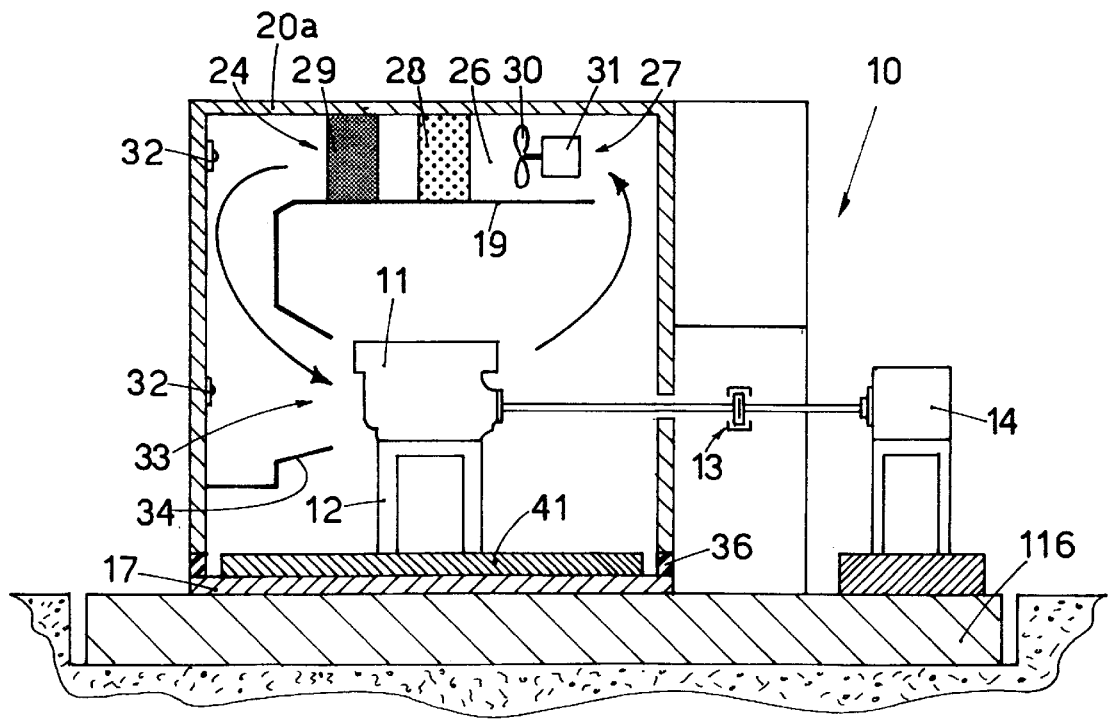
FIG. 3 shows a cross section of a variant of FIG. 1 which can be adopted for existing installations.

According to the variant shown in FIG. 3, which can be used in the case of existing installations, the test chamber 10 is associated with the existing anti-seismic base 116, on which the thermally insulated floor 17 is rested; the dynamometric brake 14 in this case is outside the test chamber 10.

Moreover, in this case, the supports 12 for the engine 11 are anchored to the thermally insulated floor 17 by means of an attachment plate 41.

In this case (FIG. 2), the lower base 17 has a substantially concave conformation with raised lateral edges 117.

All the electric and fluid connections which must be taken outside the test chamber can be conducted under the anti-seismic base 16 inside the concave part of the thermally insulated floor 17 and taken outside by means of the appropriate guide channels (not shown here) made on the raised lateral edges 117.

I claim:

1. A test chamber for testing a motor vehicle engine comprising:
   a thermally insulated floor (17) in functional contact with an anti-seismic supporting base (16, 116), the thermally insulated floor (17) cooperating with a covering system (20) which can be moved from an open position to a closed position, the covering system (20) in the closed position defining an inner work area (21), closed and controlled at least thermally, housing at least a test bench for the engine (11) being tested, the engine (11) being functionally connected to braking means (14),
   wherein the covering system (20) is attached to a cantilever lifting system (39) comprising lifting and guide means (23) anchored between at least a lifting column (37) placed on the ground and arranged at the side of the thermally insulated floor (17) and a lateral extension cooperating with the upper part of the covering system.

2. The test chamber as in claim 1, wherein the covering system (20) comprises, at its upper part, at least a channel (26) to convey and treat air defined between the ceiling (20a) of the covering system (20) and a false ceiling (19), there being included along the channel (26) to convey and treat air an air conditioning unit (24) comprising at least a ventilation system (27), a heating unit (28) and a cooling unit (29).

3. The test chamber as in claim 1, wherein the lateral extension made in the upper part of the covering system (20) comprises a box structure (25) containing the feeder units for the heating unit (28) and/or the cooling unit (29) of the air conditioning unit (24) cooperating with the inside of the test chamber (10).

4. The test chamber as in claim 1, wherein an outlet of a channel to convey and treat air (26) is in communication with the inner work area (21) of the test chamber (10) by means of a delivery mouth (33) to deliver the flow of thermally adjusted air.

5. The test chamber as in claim 1, wherein a delivery mouth (33) comprises deflector means (34) for directing the flow of thermally adjusted air in the direction of the engine (11).

6. The test chamber as in claim 1, wherein a heating unit (28) comprises a heat exchanger of the type using fluid.

7. The test chamber as in claim 1, wherein a heating unit (28) comprises a plurality of electric heat elements.

8. The test chamber as in claim 1, wherein a ventilation system (27) comprises a motor (31) comprising a frequency converter.

9. The test chamber as in claim 1, wherein the lateral extension of the covering system (20) comprises two upper anchor zones (40) for the lifting and guide means (23) located, respectively, at one side and another side of a box structure (25).

10. The test chamber as in claim 1, wherein the lifting and guide means (23) comprise lifting actuators (42) cooperating with respective guide elements (38).

11. The test chamber as in claim 1, wherein the anti-seismic supporting base (16) is placed inside the inner work area (21) and is functionally supported by the thermally insulated floor (17).

12. The test chamber as in claim 11, wherein the anti-seismic supporting base (16) cooperates at the lower part with support and shock-absorber means (18).

13. The test chamber as in claim 1, wherein the thermally insulated floor (17) is supported by an existing anti-seismic base (116).

14. The test chamber as in claim 13, wherein the engine (11) is functionally supported by the thermally insulated floor (17) by an attachment plate (41) supported by the thermally insulated floor.

15. The test chamber as in claim 1, wherein the thermally insulated floor (17) comprises a floor which is concave inside and underneath the supporting base (16) including raised lateral edges (11) for the passage of at least one member of the group consisting of pipes and conduits to the outside of the test chamber (10).

16. The test chamber as in claim 1, wherein between the thermally insulated floor (17) and the covering system (20) there are packing strips (36).

17. The test chamber as in claim 1, wherein inside at least one member of the group consisting of a channel to convey and treat air (26) and the inner work area (21) there are monitors to detect the temperature (32).

18. The test chamber as in claim 1, wherein at least one temperature monitor (32) is placed in a position near the engine (11).

* * * * *